United States Patent Office 3,649,600
Patented Mar. 14, 1972

3,649,600
POLYETHER SPANDEX THREADS
Cyril N. Harper and Ralph A. Maglio, Easthampton, Mass., assignors to J. P. Stevens & Co., Inc., New York, N.Y.
No Drawing. Continuation-in-part of application Ser. No. 718,218, Apr. 12, 1968. This application May 5, 1970, Ser. No. 34,889
Int. Cl. C08g 22/14
U.S. Cl. 260—77.5 AP    5 Claims

ABSTRACT OF THE DISCLOSURE

This specification discloses polyurethane compositions suitable for producing melt extruded threads prepared by reacting (i) a polyether containing from 0.06% to 0.3% water based on the weight of the polyether and (ii) an organic diisocyanate to form an isocyanato-terminated prepolymer and thereafter reacting the prepolymer with a diol chain extender.

RELATED APPLICATIONS

This application is a continuation-in-part of our prior application Ser. No. 718,218, filed Apr. 12, 1968, which application in turn was a continuation-in-part of our prior co-pending application Ser. No. 528,539, filed Jan. 27, 1965, both cases now being abandoned.

BACKGROUND OF THE INVENTION

Polyurethane elastic threads, which are known generically in the art as spandex threads, have achieved use in elastic fabrics. In general, two types of polyurethanes have been developed, those based on polyesters and those based on polyethers. It is with improved compositions of the latter type that the present invention deals.

Spandex threads based on polyethers have been produced by various processes, in general by dispersing in solvents, spinning and removing the solvent. Polyester based spandex threads have been prepared both by solvent spinning or extrusion processes and by so-called melt spinning or extrusion processes in which the composition is heated to a temperature at which it flows, is spun through suitable nozzles into baths or other environments in which the extruded thread sets or hardens to the final thermoplastic spandex composition. Normally some aging and/or exposure to water or similar materials follows to produce a predetermined limited amount of cross-linking. The spandex threads are predominantly linear polymers, but a small amount of cross-linking is ordinarily present and is desirable.

Up to the present time there has been no practical process or composition for polyether based spandex threads produced by melt extrusion and compositions which are capable of being so extruded. Polyether based spandex threads produced by other processes, such as for example solvent extrusion, have been extremely successful and constitute an acceptable and practical commercial product. However, the processes by which they are made present severe problems. Solvents have to be handled which present fire and toxic problems and increase the cost of production because the solvent is either lost or requires expensive and complicated recovery equipment. A typical example of a polyether based spandex referred to above is represented by the Steuber Pat. 2,929,804. The composition and threads include in addition to the polyether building blocks, segments of ureas, the proportion of urea being from 10% to 40%.

It has also been proposed to extend a polyether based prepolymer with a diamine. Such a product sets up, and while it can be milled on a cold rubber mill and molded, it cannot be melt extruded.

SUMMARY OF THE INVENTION

The present invention produces polyether based spandex compositions and threads which can be produced by melt extrusion and have superior properties. In general the polyurethane compositions are produced by using polyether resins which are reacted with diisocyanates. The products then are chain-lengthened with diol extenders, of which butane 1,4-diol is the most common one used. The present invention uses polyether resins of molecular weight from 1500 to 2500 which are reacted with the same types of isocyanates that have been used before. The invention also uses diol extenders which permit excellent resistance to discoloration in the AATCC 1967 Technical Manual gas fading Test No. 23—1962.

The preesnt invention, in addition to the limitation on the molecular weight of the polyether resins referred to above, has two critical limitations. The first is an amount of water based on the weight of the polyether resin which is sharply critical. It varies from 0.06 to 0.3%, with an optimum near 0.15%. This amount of water corresponds to a calculated content of substituted urea segment in the final fiber of about 2.78% in a typical composition. The formula of the urea segment is as follows:

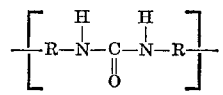

in which R is the organic radical of the organic diisocyanate used.

The water is used in the formation of the original composition which is extruded after being melted. It should not be confused with the use of water vapor for curing or producing limited amount of cross-linking after a spandex thread has been extruded. On the contrary, the water is introduced into the formulation at a time when the diisocyanate is present which can react with the water to form urea. It performs, chemically, an entirely different function than water vapor, which cross-links already produced spandex threads in which most of the isocyanate has reacted with the polyether resin and the diol extender to produce the polyurethane structure.

The second limitation is the amount of the diol extender which is used. This extension is customarily expressed in the art as a percentage of the free isocyanate groups which are reacted with the hydroxyl groups of the diol extender. As in all normal spandex prepolymers, there are some free isocyanate groups. The extension limits for the present invention are from at least 90% to not more than 103%, with optimum ranges from 96% to 99%.

While the present invention requires definite ranges of molecular weights of the polyether resins used, the critical amount of water present and the definite, although not quite so narrow, range of diol extensions, the chemical nature of the polyether resin is not that which distinguishes the present invention from the prior art. A preferable polyether resin is represented by polytetramethylene ether glycol, but the other known types of polyether resins may be used.

The chemical nature of the diisocyanates used in making the prepolymer is also not changed by the persent invention. The most common diisocyanate is methylenebis (4-phenylisocyanate). This compound is ordinarily referred to in the art as MDI, and this abbreviation will be used throughout the remainder of the specification. Other isocyanates may also be employed, such as toluenediisocyanate, usually referred to as TDI, and the like. Since the isocyanates used are not changed by the present invention, the above referred to compounds are typical examples and the invention is not limited thereto.

The diol extenders used in the present invention in the range set forth above are the common diol extenders used in the polyurethane art. The most common one is 1,4-butanediol. Any of the other well known diol extenders may be used. However, the extender must be a diol, and the other types of extenders which contain amino groups cannot be used as they result in compositions which set up and which cannot be melt extruded.

The properties of the resin after extension can be correlated with a measurement which is known as elastic limit set. This is tested by stretching the thread to a 200% elongation and heating while stretched at 230° F. for ten minutes. After exposure to heat is completed, the thread is released and the increase in length is measured and converted into a percentage figure based on the original length of the thread before stretching and heating. It has been found that this elastic limit set must be kept within a narrow range of about 95% to about 120%, and this corresponds to a diol extension of from 90% to 103%. It the elastic limit set is below 90%, the flex life of an elastic fabric made from a polyurethane resin which shows the elastic set when tested as described above, there is excessive breaking with flexing. This test is normally made by flexing 20 individual threads between 100% and 300% stretch at a speed of 115 cycles per minute. After every thousand cycles the test is interrupted and the number of broken threads are noted. This test is continued until a total 15,000 flexes are reached. Of course, no breaks at all is ideal, but for practical purposes breaks not exceeding about 15 for 15,000 flexes is acceptable. This is obtainable with 95% diol extension and an elastic limit set of 115. Elastic limit sets above about 120% shows no breaks in the flex tests, but the modulus of a fabric drops off to the point where its holding power is inadequate. Typical tables will follow specific examples. It should be understood that useful fabrics are not made from threads which have been subjected to the elastic limit sets test, for, of course, these threads are no longer useful. However, the test accurately correlates with useful physical properties of the threads before they have been tested.

DESCRIPTION OF THE PREFERRED EMBODIMENTS

The invention will be described in greater detail in conjunction with the following specific examples, which are intended to be illustrative only and in which the parts are by weight unless otherwise specified.

Example 1

100.7 parts of a polytetramethylene ether glycol resin of average molecular weight of 2,000 were tested for moisture content. The moisture content was determined in a conventional Karl Fischer apparatus and distilled water added until the moisture content was 0.15%. 35.63 parts of MDI, preheated to 160° F., were added and the temperature raised to approximately 212° F., the reaction being maintained until substantially complete. 1,4-butanediol was then added to about 200° F. in amounts to produce 97.5% extension. After the extension was complete, the composition was precured for 2 hours at 230° F. and aged at room temperature for one week to get the melt stick up to 475° F., melted and melt extruded through an extrusion head as described in the Lipski Pat. 3,057,009 to produce spandex threads. The threads were then tested for physical properties, showing a modulus at 300% extension of 752 p.s.i. When stretched to breaking, the threads showed elongation of 540% to 550%. The tensile strength at break was 12,900 p.s.i. When tested for set after one cycle on an Instron tester the set was about 40%. On testing for flexing there were no breaks in 15,000 flexes. When tested for boiling water resistance (two hours), the loss in modulus was under 10%.

The example given with the amount of water specified theoretically calculates to give substituted urea segments in the final fiber as follows:

| | |
|---|---|
| (1) Resin | 100.7 |
| (2) Water | 0.151 |
| (3) MDI | 35.63 |
| | 136.481 |
| (4) 1,4 Butanediol (97) | 7.10 |
| | 143.581 |

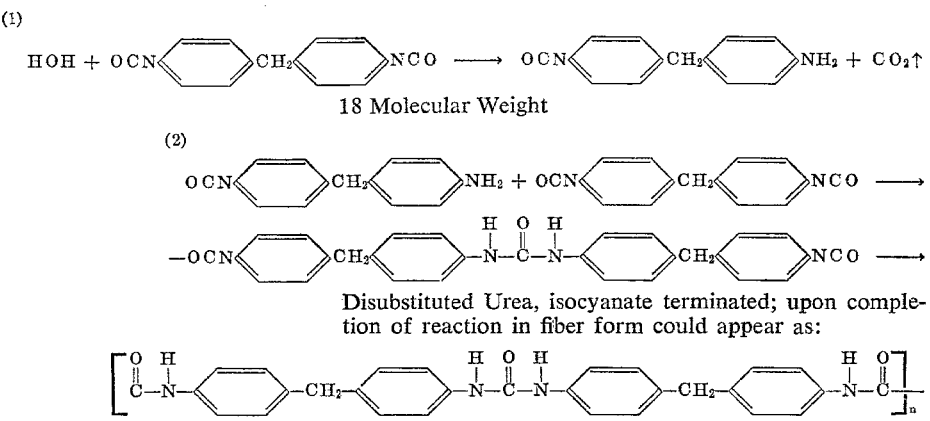

476 Molecular Weight $$\text{Di-urea} = \frac{476(.151)}{18} = 3.99 \text{ grams formed}$$

$$\frac{3.99}{143.581}(100) = 2.78\% \text{ of fiber}$$

Example 2

The procedure of Example 1 was repeated varying the amount of extension from 90% to 103%. Set increased very rapidly and reached unsatisfactory values at about 103% extension. On the other hand, modulus remained about the same up to about 99% extension and then dropped rapidly to 500 p.s.i. at just beyond 103%. Elongation, as would be expected, increased with extension, being about 475% at 93% extension, 530% at 95% extension, and reaching a maximum of about 600% at 101% extension.

The following table sets forth correlation of properties with varying amounts of diol extension beyond the useful limits. In column headings "Extension" refers to diol extension, "M300" to modulus at 300% stretch, "Eb" elongation at break, "Tb" tensile strength at break. The other columns are self-explanatory.

TABLE 1

| Percent extension | M300 | Percent Eb | Tb | Elastic limit set | Flex breaks at cycle |
|---|---|---|---|---|---|
| 65 | 1,035 | 520 | 10,200 | 84 | 11/3000 |
| 90 | 1,190 | 520 | 11,600 | 115 | 15/15M |
| 95 | 1,350 | 500 | 12,400 | 115 | 16/15M |
| 100 | 1,285 | 550 | 15,200 | 120 | 0/15M |
| 105 | 372 | 620 | 5,400 | 185 | 0/15M |

It will be seen that when the diol extension is below 90%, flex breaks become excessive for any ordinary use, and at 65% extension the threads are useless for any purposes. It will be noted that as the extension increases modulus or power slowly increases, reaching a maximum between 95% and 100% extension; and at 105% extension, which corresponds to an elastic set limit of 185, the modulus has dropped to an extent that renders the thread practically useless. A similar trend will be seen in the tensile strength at break, which also increases as one goes into the useful extension range and then drops off precipitously at 105% extension.

Example 3

The procedure of Example 1 was repeated varying the water content, the figures being taken at 90% extension. The modulus began to drop below 0.06% and remained good up to about 0.3%. At this point, however, boiling water resistance fell off seriously and flexing was also somewhat poorer, showing from 13 to 15 breaks in 15,000 flexes.

With the preferred ranges for water and extension, commercially useful spandex threads were obtained with the water optimum of about 0.15% and the extension from 96% to 98%.

The procedure of Example 2 was repeated for various extensions but using ethylene glycol as the diol extender instead of 1,4-butane diol. The following table gives physical characteristics at different percentages of extension. However, in this example only extensions within the useful range are included.

TABLE 2

| Percent extension | M300 | Percent Eb | Tb |
|---|---|---|---|
| 93 | 1,220 | 525 | 12,100 |
| 95 | 918 | 495 | 11,200 |
| 97 | 920 | 550 | 12,600 |
| 101 | 770 | 570 | 10,200 |

It will be seen that the properties vary similarly to those for butane diol extension in Table 1, but the modulus at 300% extension is somewhat lower though still useful.

Example 4

This example compares diamine extended products with the diol extended products of the present invention. The procedure of Example 2 was repeated using 1,4-cyclohexane-bis(methyl amine) in three extensions, 90%, 95% and 97%. The products obtained in all three extensions are useless as they cannot be extruded into threads by melt extrusion processes.

We claim:

1. A polyurethane melt extrudable to form fibers prepared by reacting (A) one equivalent of an isocyanato-terminated polyurethane prepolymer prepared by reacting (1) an organic polyether having an average molecular weight between 1500 and 2500 and containing between 0.06% and 0.3% of water based on the weight of the polyether before reacting with a diisocyanate, and (2) an organic diisocyanate and (B) from 0.9 to 1.03 equivalents of a monomeric aliphatic diol, the polyurethane having an elastic set limit from 95% to 120% when measured by stretching a melt extruded thread from the polyurethane to 200% of its original length, heating the thread at 230° F. for 10 minutes in its stretched condition, cooling and relaxing tension, and measuring the length, the elastic set limit being the percentage of increased length over original length before heating.

2. A polyurethane according to claim 1 in which the monomeric aliphatic diol is 1,4-butane diol.

3. A polyurethane according to claim 2 in which the water content of the polyether before reacting with the diisocyanate is approximately 0.15% and the number of equivalents of the butane diol are from 0.96 to 0.99.

4. A polyurethane according to claim 1 in which the diisocyanate is methylenebis(4-phenylisocyanate).

5. A polyurethane according to claim 2 in which the diisocyanate is methylenebis(4-phenylisocyanate).

References Cited
UNITED STATES PATENTS 2,929,800    3/1960    Hill    260—77.5
3,077,006    2/1963    Ibrahim    19—48

OTHER REFERENCES

Saunders et al., Polyurethanes, Part II, Interscience, N.Y., 1964, p. 317.

DONALD E. CZAJA, Primary Examiner

M. J. WELSH, Assistant Examiner